(12) United States Patent
Dominowska et al.

(10) Patent No.: US 10,346,854 B2
(45) Date of Patent: Jul. 9, 2019

(54) FEATURE-VALUE ATTACHMENT, RERANKING AND FILTERING FOR ADVERTISEMENTS

(75) Inventors: Ewa Dominowska, Kirkland, WA (US); Robert J. Ragno, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1477 days.

(21) Appl. No.: 11/948,721

(22) Filed: Nov. 30, 2007

(65) Prior Publication Data
US 2009/0144141 A1 Jun. 4, 2009

(51) Int. Cl.
*G06Q 30/02* (2012.01)

(52) U.S. Cl.
CPC ......... *G06Q 30/02* (2013.01); *G06Q 30/0242* (2013.01)

(58) Field of Classification Search
USPC .......................................................... 705/14
See application file for complete search history.

(56) References Cited

U.S. PATENT DOCUMENTS

| | | | |
|---|---|---|---|
| 6,108,645 A | 8/2000 | Eichstaedt et al. | |
| 6,243,699 B1 | 6/2001 | Fish | |
| 6,591,248 B1 | 7/2003 | Nakamura | |
| 7,089,237 B2 | 8/2006 | Turnbull | |
| 7,136,875 B2 | 11/2006 | Anderson | |
| 7,188,137 B2 | 3/2007 | Inoue | |
| 7,251,616 B1 | 7/2007 | Perttunen | |
| 7,376,591 B2 * | 5/2008 | Owens | 705/14.4 |
| 8,352,499 B2 * | 1/2013 | Bharat et al. | 707/791 |

(Continued)

FOREIGN PATENT DOCUMENTS

| | | |
|---|---|---|
| JP | 2002-32383 | 1/2002 |
| JP | 2002-108924 | 4/2002 |

(Continued)

OTHER PUBLICATIONS

The Robert Gordon University's HARD Track Experiments at TREC 2004, http://www.scils.rutgers.edu/~muresan/Publications/trecHarper2004.pdf.

(Continued)

*Primary Examiner* — Saba Dagnew
(74) *Attorney, Agent, or Firm* — Shook, Hardy & Bacon L.L.P.

(57) ABSTRACT

An approach is provided for associating structured information as feature-value pairs with advertisements at an advertisement system that provides advertisements for presentation with primary content. Feature-value pairs corresponding with advertisements describe features of the products or services associated with the advertisements. The feature-value pairs may be used by the advertisement system in a number of different manners, including, among other things: using the feature-value pairs during selection of advertisements for presentation with primary content: allowing users to sort and/or filter advertisements during presentation with primary content based on the associated feature-value pairs; exposing additional information with the advertisements; facilitating fraud detection for the advertisement system; and enabling a hybrid pricing model.

20 Claims, 10 Drawing Sheets

(56) References Cited

U.S. PATENT DOCUMENTS

| | | | |
|---|---|---|---|
| 8,374,915 B2* | 2/2013 | Hayes et al. | 705/14.73 |
| 2001/0047298 A1 | 11/2001 | Moore | |
| 2003/0004831 A1 | 1/2003 | Owens | |
| 2004/0167928 A1 | 8/2004 | Anderson et al. | |
| 2005/0021403 A1 | 1/2005 | Ozer et al. | |
| 2005/0071224 A1 | 3/2005 | Fikes et al. | |
| 2005/0251444 A1* | 11/2005 | Varian et al. | 705/14 |
| 2006/0075328 A1 | 4/2006 | Becker et al. | |
| 2006/0259360 A1 | 11/2006 | Flinn | |
| 2006/0287919 A1 | 12/2006 | Rubens | |
| 2007/0027760 A1 | 2/2007 | Collins et al. | |
| 2007/0078851 A1 | 4/2007 | Grell et al. | |
| 2007/0083611 A1 | 4/2007 | Farago | |
| 2007/0100709 A1 | 5/2007 | Lee et al. | |
| 2007/0143260 A1 | 6/2007 | Markov | |
| 2007/0156621 A1 | 7/2007 | Wright et al. | |
| 2007/0214045 A1 | 9/2007 | Subramanian et al. | |
| 2007/0214154 A1 | 9/2007 | Ducatel | |

FOREIGN PATENT DOCUMENTS

| | | |
|---|---|---|
| JP | 2003-150629 | 5/2003 |
| JP | 2004-234520 | 8/2004 |
| JP | 2006-277281 | 10/2006 |
| JP | 2007-293544 | 11/2007 |
| KR | 1020060036011 A | 4/2006 |
| KR | 1020070010198 A | 1/2007 |
| TW | 491972 B | 6/2002 |
| WO | WO 01/57610 | 8/2001 |
| WO | WO 2007/035499 | 3/2007 |

OTHER PUBLICATIONS

Behold: a content based image search engine for the World Wide Web, http://www.doc.ic.ac.uk/~agy02/pubs/behold.pdf.
For Shopping Sites, Buyer Be Wary, http://www.mallnetworks.com/news/20061122_01.htm.
European Search Report for EP 08 85 6998, dated Aug. 10, 2011.
Official Journal EPO, XP007905525, pp. 592-593, Nov. 2007.
"Office Action Issued in Korean Patent Application No. 10-2010-7011149", dated Aug. 14, 2014, 6 Pages.
"Office Action Issued in Canadian Patent Application No. 2,702,613", dated Apr. 28, 2015, 7 pages.
Kruse, Matt, "Table Sorting, Filtering, Etc", published Apr. 10, 2015, http://www.javascripttoolbox.com/lib/table/, 2 pages.
Kruse, Matt, "Table Sorting, Filtering, Etc", published Oct. 12, 2007, http://web.archive.org/web/20071012040404/http://www.javascripttoolbox.com/lib/table/; 3 pages.
"Office Action Issued in Canadean Patent Application No. 2702613", dated Apr. 11, 2016, 07 pages.
"Office Action issued in Canadian Patent Application No. 2702613", dated Mar. 7, 2017, 9 pages.
"Office Action Issued in Indian Patent Application No. 2885/CHENP/2010", dated Apr. 27, 2018, 5 Pages.
"International Search Report & Written Opinion for PCT Patent Application No. PCT/US2008/079996", dated May 29, 2009, 11 Pages.

* cited by examiner

US 10,346,854 B2

FEATURE-VALUE ATTACHMENT, RERANKING AND FILTERING FOR ADVERTISEMENTS

BACKGROUND

Online advertising has become a significant aspect of computing environments, as it presents a powerful way for advertisers to market their products and services. There are a variety of advertisement systems that may deliver advertisements for presentation with some primary content. For instance, advertisements may be selected for presentation with web page search results from a search engine. As another example, web page owners may provide space on their web pages for including advertisements. As a further example, advertising-based software has become more prevalent, in which advertisements may be presented within an application window for the software such that the software may be provided to users at little or no cost. Existing advertisement systems often select and rank advertisements for presentation with the primary content based on expected monetization and/or relevance to the context of the primary content. For instance, some advertisements systems may perform an auction process that selects and ranks advertisements based on a combination of expected monetization and relevance to the primary content.

When advertisements are presented with primary content, they are typically restricted to being presented within a small area of the overall available display space. For instance, advertisements may be presented on a search results page to the side, above, or below search results. Similarly, advertisements may be presented on a web page to the side, above, or below the primary content of the web page. As a result, the advertisements often include very little information, such as a title, a very short description, and an advertisement landing page URL. Often, users cannot determine from the advertisement presentation itself whether the advertiser has a product or service the user is seeking. As such, users are required to select an advertisement to view an associated advertisement landing page to access more information. In some cases, a user may need to select multiple advertisements and go back and forth between the original advertisement presentation and advertisement landing pages before the user may find what the user is seeking. Additionally, as the user goes to the landing page, in many cases, the user looses the context of the original environment and have to redo a search on the advertiser's site before being able to find relevant information from that advertiser.

Current advertisement systems and the way advertisements are presented not only often require users to perform a large amount of work before finding information they are seeking but also result in large amount of clicks with no user intent of conversion. Accordingly, in pay-per-performance advertisement systems in which advertisers pay per user click on presented advertisements, the advertisers are paying for user clicks that have little to no benefit to the advertiser.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to attaching structured information as feature-value pairs to advertisements that are presented in conjunction with primary content, such as search results, web pages, and within advertisement-based software applications. Advertisement systems may associate the feature-value pairs with corresponding advertisements and store the information for use in delivering advertisements for presentation with primary content. The feature-value pairs may assist initial advertisement selection and ranking. Additionally, the feature-value pairs may allow users to sort and/or filter advertisements while the advertisements are being presented with primary content. Supplemental information may also be presented with the advertisements from the feature-value pairs. Further, the feature-value pairs may facilitate fraud detection and may allow the advertisement system to employ a hybrid pricing model.

BRIEF DESCRIPTION OF THE DRAWINGS

The present invention is described in detail below with reference to the attached drawing figures, wherein.

DETAILED DESCRIPTION

Figure 1:
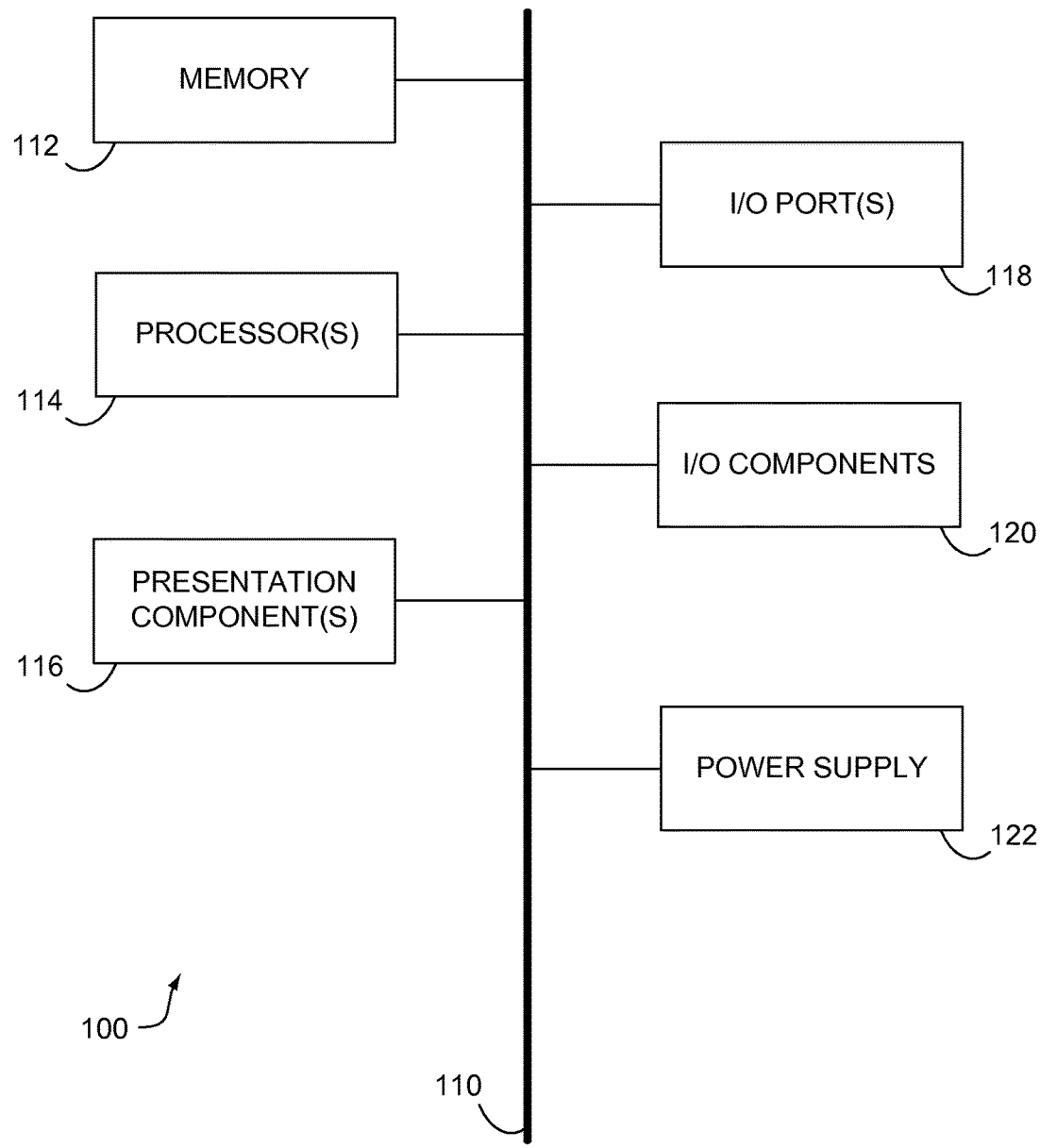
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed previously, embodiments of the present invention relate to attaching structured information to advertisements that are presented in conjunction with some primary content, such as search results, web pages, and within advertisement-based software applications, for instance. Structured information may be associated with advertisements as feature-value pairs that describe the products or services associated with the advertisements. In embodiments, when advertisers submit advertisements to an advertisement system that facilitate the delivery of advertisements with primary content, the advertisers may submit structured information as feature-value pairs for association with the advertisements. In some embodiments, automated methods of extracting feature-value pair information for advertisements may be employed.

The advertisement system associates the feature-value pairs with advertisements and may employ the structured information in a number of different manners within various embodiments of the invention. For instance, in an embodiment, the feature-value pairs may be used during the initial selection of advertisements, for instance, by facilitating the selection of advertisements that are relevant to the context of the primary content and/or relevant to users viewing the advertisements. In an embodiment, the feature-value pairs may be used to allow users to sort and/or filter advertisements while the advertisements are being presented with the primary content. The information displayed with the advertisements may also be supplemented with feature-value information. Accordingly, users have more information about the products and/or services associated with the advertisements. Additionally, embodiments allow users to access more targeted advertisements, thereby likely in resulting in higher user satisfaction with the advertisements and higher conversion rates for advertisers.

Feature-value pair information associated with advertisements may also improve fraud detection by facilitating the detection of anomalies in click patterns within advertisement systems. Further, by associating feature-value pairs with advertisements and allowing users to sort and/or filter advertisements, advertisement systems may employ hybrid pricing models, in which advertisers may pay on a per-impression basis when advertisements are presented to users based on user sorting/filter, and advertisers may also pay on a per-click or per-conversion basis.

Accordingly, in one aspect, an embodiment of the present invention is directed to one or more computer-storage media embodying computer-useable instructions for performing a method that includes receiving an advertisement from an advertiser. The method also includes receiving one or more feature-value pairs and associating the feature-value pairs with the advertisement. The method further includes storing the advertisement and the feature-value pairs for use in an advertisement system that provides advertisements for presentation in conjunction with primary content.

In another embodiment, an aspect of the invention is directed to one or more computer-storage media embodying computer-useable instructions for performing a method that includes presenting a number of advertisements with primary content, wherein at least a portion of the advertisements each have associated feature-value pairs. The method also includes presenting one or more user interface elements with the advertisements, wherein the user interface elements allow the advertisements to be sorted or filtered based on the feature-value pairs associated with the advertisements. The method further includes receiving a user command via at least one of the user interface elements to sort or filter the advertisements, and sorting or filtering the advertisements based on the user command.

A further aspect of the invention is directed to one or more computer-storage media comprising computer-useable instructions for performing a method that includes receiving a request for advertisements for presentation with primary content. The method also includes selecting the advertisements for presentation with the primary content based at least in part on feature-value pairs associated with at least a portion of the advertisements. The method further includes communicating the advertisements for presentation with the primary content.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
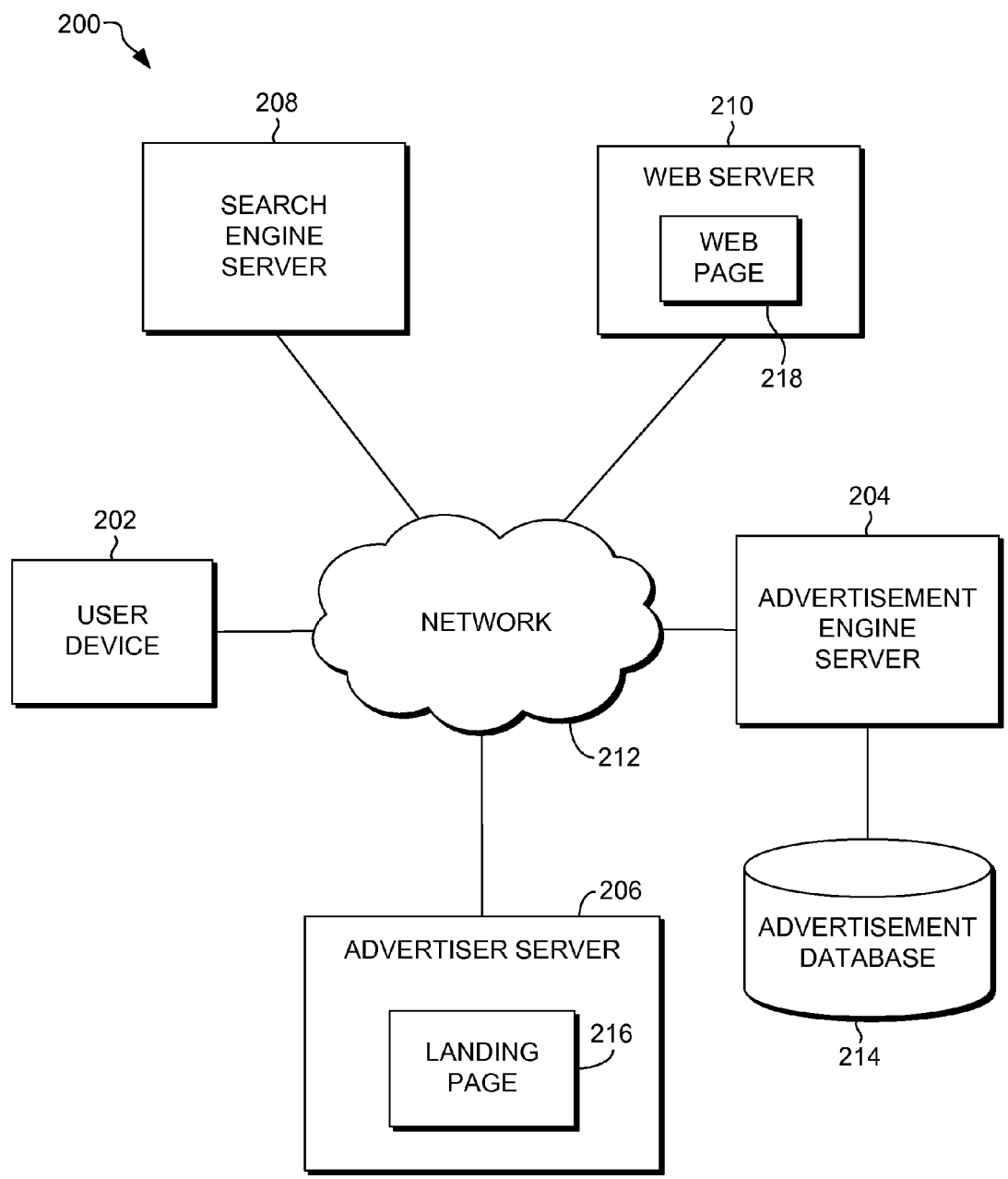
FIG. 2 is a block diagram is an exemplary system in which embodiments of the present invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a user device 202, an advertisement engine server 204, an advertiser server 206, a search engine server 208, and a web server 210. Each of the components shown in FIG. 2 may be any type of computing device, such as computing device 100 described with reference to FIG. 1, for example. The components may communicate with each other via a network 212, which may include, without limitation, one or more local area networks (LANs) and/or wide area networks (WANs). Such networking environments are commonplace in offices, enterprise-wide computer networks, intranets, and the Internet. It should be understood that any number of user devices, advertisement engine servers, advertiser servers, search engine servers, and web servers may be employed within the system 200 within the scope of the present invention. Additionally, other components not shown may also be included within the system 200.

The system 200 of FIG. 2 illustrates an architecture in which advertisements may be provided for presentation to users at user devices, such as the user device 202, in accordance with an embodiment of the invention. Generally, an advertisement system may be provided by an advertisement service provider, who may maintain one or more advertisement engine servers, such as the advertisement engine server 204, for serving advertisements, for instance, from a database 214 of advertisements. A variety of different advertisers may submit advertisements to the advertisement system. When submitting an advertisement to the advertisement system, an advertiser may generally provide a variety of information associated with the advertisement. For instance, the advertiser may supply a title and a description for the advertisement. Additionally, the advertiser may provide a URL for a landing page associated with the advertisement, such as the landing page 216 maintained at the advertiser server 206. For advertising systems that employ an auction process for selecting advertisements, the advertiser may provide keywords and a bid amount for each keyword. In some cases, the advertiser may also provide targeting information to facilitate advertisement selection. For instance, an advertiser may specify that the advertisement should only be delivered to users in a particular geographic location or only to males.

In accordance with embodiments of the present invention, an advertiser may also submit structured information as feature-value pairs for association with an advertisement. A feature-value pair comprises a feature corresponding with an attribute of the type of product or service associated with the advertisement and a value defining the feature for that product or service. For example, a hotel advertiser could assign the following feature-value pairs for an advertisement: Location:Paris; Price:$100; Amenities:Pool; Amenities:Internet. A camera advertiser could choose to provide the following tags for an advertisement: Brand:CANON; Resolution:8; Price:$500. A travel advertiser can tag its airline advertisement with the following feature-value pairs: airline:Northwest; destination:Hawaii; price:$400. In some embodiments, advertisers who want to keep their advertisements more generic can associate multiple values to the same type of tag. For example, the same travel advertiser can also associate the following feature-value pairs with the airline advertisement: (airline:Alaska; destination:Alaska; origin:Seattle; price:$300) and (destination:Seattle; origin:LA; price:$199) and so on.

As will be described in further detail below, the structured information may be employed in a variety of different manners, including, but not limited to: allowing a user to sort and/or filter advertisements; providing further information to a user when advertisements are presented; facilitating ranking of advertisements; facilitating fraud detection; and allowing hybrid pricing models.

In some embodiments, an advertiser may manually provide structured information as feature-value pairs for association with advertisements. In other embodiments of the invention, structured information may be automatically extracted and associated with an advertisement as feature-value pairs. For instance, in one embodiment, a landing page associated with an advertisement may be crawled and information extracted to identify feature-value pairs for association with the advertisement. In another embodiment, opinion mining may be used to automatically extract structured information for an advertisement. For instance, an advertising system can leverage existing attribute and opinion mining systems and derive tags for advertisements automatically by analyzing the advertiser site or inventory database and extracting feature-value pairs.

In some embodiments of the invention, an advertiser may freely provide feature-value pairs for association with an advertisement. For instance, an advertiser may submit an advertisement with feature-value pairs for any feature the advertiser wishes to define for that advertisement. In other embodiments, a collection of features may be predefined for the advertisement system. Appropriate features may be selected from the collection for a given advertisement to generate feature-value pairs for that advertisement.

In further embodiments, sets of domain-specific features may be used for associating feature-value pairs with an advertisement. In particular, a set of domain-specific features may be predefined for each of a variety of different domains. A domain may refer to, for instance, a particular industry, market, product type, or service type. An advertisement may be associated with a given domain and the set of domain-specific features for that domain may be used to generate feature-value pairs for association with that advertisement. In particular, each domain may have particular features that are relevant. For instance, the set of features for a digital camera domain may include: brand; resolution; weight; optical zoom; and price. As another example, the set of features for a hotel domain may include: location; amenities; room type; and price. Note that some features, such as price, may not be domain-specific, while other features are domain-specific. In embodiments, different levels of domains may be employed from a hierarchy of domains. For instance, an electronic products domain may be a parent domain to digital cameras, portable media players, and televisions domains. As another example, a travel domain may include airfare, hotel, and rental car domains.

When predefined features are employed (whether domain-specific or domain-independent), predefined values may or may not be associated with the predefined features in various embodiments. For instance, in some cases, a predefined feature may not have any predefined value associated with it, allowing any value to be associated with the feature to generate a feature-value pair for an advertisement. For instance, a price feature may allow any number to be provided as a value. In other cases, a predefined feature may have predefined values associated with it. For example, a resolution feature for a digital camera may include the following predefined values possible for selection: 1 megapixel, 2 megapixels, 3 megapixels, 4 megapixels, 5 megapixels, etc. In some instances, the predefined values may be ranges. For instance, a resolution feature for a digital camera may include value ranges such as: less than 2 megapixels; 2-3 megapixels; 4-6 megapixels; and more than 6 megapixels. When predefined values are employed, an appropriate value is selected when associating a feature-value pair with an advertisement.

Using advertisement information collected from advertisers, the advertisement engine server 204 may serve advertisements to the user device 202 in a number of different manners within embodiments of the invention. Generally, the advertisements are selected for presentation in conjunction with a primary content, such as, for instance, search results, a web page, or contents of a software application. For instance, in some embodiments, advertisements may be selected for presentation in conjunction with search results from a search engine, such as the search engine server 208. In such embodiments, a user may employ a web browser or other mechanism on the user device 202 to communicate with the search engine server 208. For instance, a user may issue a search query to the search engine server 208 and receive search results. The search query may comprise one or more search terms, and the search engine server 208 attempts to provide search results that are relevant to those search terms. Advertisements are also selected by the advertisement engine server 208 and provided to the user device 202 for presentation with the search results. Typically, the advertisements are selected based on the search query, for instance, using an auction process in which advertisers have bid on keywords associated with the advertisement and advertisements are selected based on advertisers' bids on keywords corresponding with the search query. However, other methods of selecting advertisements may be employed within the scope of embodiments of the present invention.

In other embodiments, advertisements may be selected for presentation in conjunction with a web page or some other primary content. In some cases, contextual advertising may be employed in which advertisements are selected based on the primary content. For instance, the web server 210 may host a web page 218 directed to a particular topic. The advertisement engine server 204 may select advertisements for presentation on the web page 218 based on the context of the topic to which the web page 218 is directed, for instance, using an auction process for advertisement selection. When a user requests the web page 218, for instance, by employing a web browser or other mechanism on the user device 202, the web page 218 may be presented to the user including advertisements selected based on the content of the web page 218.

In still further embodiments, advertisements may be selected for presentation within software applications either operating on or being accessed by the user device 202. For instance, a variety of software applications are provided free of charge or at a low cost based on the inclusion of advertising within the software applications. When such a software application is run, advertisements are presented in a portion of an application window.

It should be noted that in some cases, advertisements are selected by the advertisement engine server 204 at the time the advertisements are to be presented on the user device 202, such as when a user requests a web page or issues a search query. In other cases, the advertisement engine server 204 may provide advertisements for inclusion with primary content in advance of use of the primary content. For instance, the advertisement engine server 204 may provide advertisements to the web server 210, which incorporates the advertisements with the web page 218 prior to a user request for the web page. As another example, in some embodiments, the advertisement engine server 204 may serve advertisements to the user device 202 prior to their use for caching on the user device 202. In such embodiments, when advertisements are to be presented on the user device 202, the advertisements may be selected from the local cache as opposed to obtaining the advertisements from the advertisement engine server 204 at that time.

Although specific embodiments of selecting and presenting advertisements have been described, one skilled in the art will understand that embodiments of the present invention apply to the presentation of advertisements in conjunction with any other primary content in a variety of different manners. In some embodiments, the advertisements may be selected based on the primary content, while in other embodiments, the advertisements may be selected based on other factors or may be randomly selected. Any and all such variations are contemplated to be within the scope of embodiments of the present invention.

As noted previously, the feature-value pairs associated with advertisements may be employed in a number of different manners within the scope of embodiments of the present invention. In one embodiment, feature-value pairs may be used to allow users to filter and/or sort advertisements. For instance, when advertisements are presented to a user, user interface elements may be included to allow the user to adjust how the advertisements are presented. In some cases, users may sort the listing of advertisements based on a particular feature. For example, a user may sort the listing of advertisements based on price (e.g., low price to high price or vice versa). In other cases, a user may filter advertisements from the listing based on one or more features. For example, suppose a listing of advertisements presented to a user were related to digital cameras. The user could filter the advertisements based on resolution (e.g., only advertisements for digital cameras having a resolution of over 6 megapixels).

In another embodiment of the invention, feature-value pairs may be used to present additional information to the user when advertisements are presented. As noted previously, current advertising solutions typically provide a title and static information for presentation. In embodiments, the current advertisement presentation could be supplemented by structured information provided by the feature-value pairs. In particular, some of the structured information from feature-value pairs may be exposed and presented as part of the advertisement presented to the user. Given the limited space typically available for advertisements, in some embodiments, icons may be used to present the structured information. For instance, a number of dollar signs may be used to represent price. Also due to the limited space available for advertisements, only information for a subset of available feature-value pairs may be presented. In some cases, the structured information from the feature-value pairs to include in the advertisement presentation may be algorithmically determined, for instance, by taking into account user preference information indicative of what features may be of particular interest to a given user.

In further embodiments of the invention, feature-value pairs may be used to facilitate the initial selection and ranking of advertisements for presentation to a user. In some embodiments, advertisements are selected based on their relevance to the primary content with which the advertisements will be presented. The structured information provided by feature-value pairs may be used in the determination of relevance of the advertisements to the primary content. In some embodiments, feature-value pairs may be used in conjunction with user profiles or user preference information to select and rank advertisements. For example, user information may be available that indicates a particular user may fly to Seattle frequently. Based on that information, advertisements relating to airfare that have a feature-value such as Destination:Seattle may be selected and/or given higher ranking when advertisements are provided to that user. As another example, user information may be available that indicates a user would like to have advertisements automatically sorted by price. Accordingly, after advertisements are selected, the advertisements may be sorted by price when presented to the user.

In still further embodiments of the invention, associating feature-value pairs with advertisements may be facilitate fraud detection. In particular, the structured data provides more information for identifying anomalies in the advertising system, such as identifying a bot clicking on ads. In one embodiment of the invention, the system could associate user interest categories with each advertisement and detect invalid users by discovering unusual patterns. One example of such unusual pattern would be a user who clicks on advertisements across all possible user interest categories.

Associating structured information as feature-value pairs with advertisements also allows for a hybrid pricing model for advertisement systems. Currently, advertisement system providers often employ a pay-per-performance model in which advertisers pay the advertisement system provider on a per-click or per-conversion basis, for instance. Using embodiments of the present invention, an advertisement system provider may use a hybrid pricing model. In particular, when users sort and/or filter advertisements, the advertisements displayed based on the user sorting/filtering are more likely to be more relevant to the user. Accordingly, in a hybrid pricing model, an advertiser pays on a per-impression basis when advertisements are presented to users after user sorting/filtering, and also pays on a per-click basis and/or per-conversion basis when a user selects an advertisement and/or completes a conversion (e.g., purchases a product from the advertiser). In embodiments, the amount paid on the per-impression basis may differ from the amount paid on the per-click or per-conversion basis. For instance, a lower amount may be charged for the per-impression basis.

It should be understood by one skilled in the art that the various uses of feature-value pairs associated with advertisements as described herein are not mutually exclusive but may be used in conjunction with each other. For instance, feature-value pairs may be used in the initial ranking of advertisements for a given application, and may also be used to allow a user to sort and/or filter the advertisements when the advertisements are presented to the user. Any and all such variations are contemplated to be within the scope of embodiments of the present invention.

Figure 3:
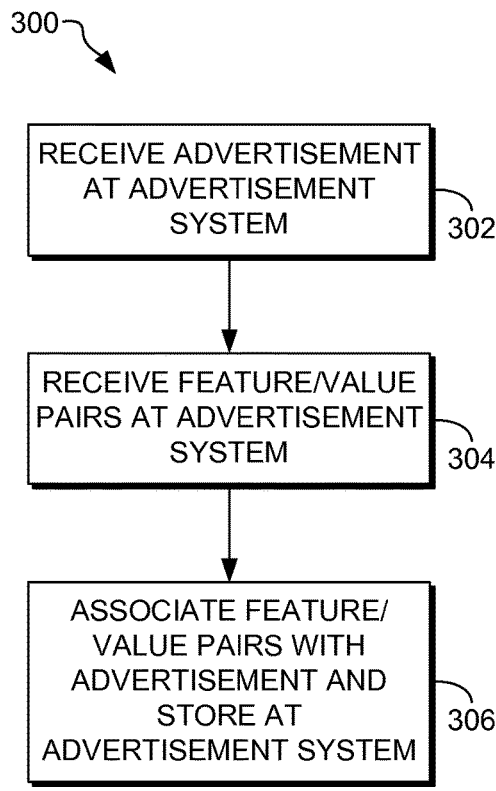
FIG. 3 is a flow diagram showing a method for associating structured information as feature-value pairs with an advertisement in accordance with an embodiment of the present invention.

Turning to FIG. 3, a flow diagram is provided illustrating a method 300 for associating structured information with an advertisement in accordance with an embodiment of the present invention. Initially, as shown at block 302, an advertisement is received at an advertisement system. An advertiser may provide an advertisement to an advertisement system in a variety of different manners within the scope of embodiments of the present invention. For example, the advertisement system may provide a user interface (UI) for allowing advertisers to submit advertisements. As another example, the advertisement system may provide application programming interfaces (APIs) for allowing advertisers to submit advertisements to the advertising system.

As shown at block 304, feature-value pairs for the advertisement are also received at the advertisement system. As described above, the feature-value pairs may be specifically provided by an advertiser (e.g., using a UI or API) or may be automatically extracted from information sources, such as advertisement landing pages, opinion information, or product databases, for instance. In some instances, feature-value pairs may be freely defined by the advertiser, while in other instances, values may be specified for predefined features.

The feature-value pairs are associated with the advertisement and stored by the advertisement system, as shown at block 306. Accordingly, the structured information provided by the feature-value pairs may be used by the advertisement system for a number of purposes, including, for instance: allowing users to sort/filter presented advertisements; facilitating ranking advertisements; exposing additional information with advertisement presentation; facilitating fraud detection; allowing for a hybrid pricing model.

Figure 4:
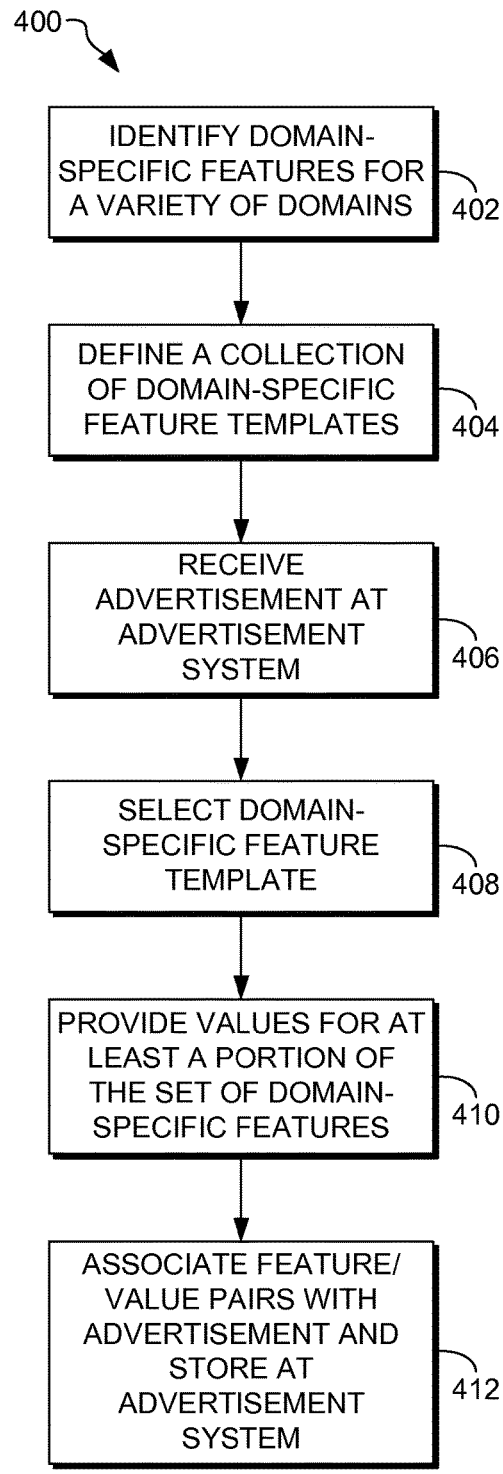
FIG. 4 is a flow diagram showing a method for receiving structured information for an advertisement using sets of domain-specific features in accordance with an embodiment of the present invention.

As described above, in some embodiments, sets of domain-specific features may be identified for a variety of domains and used for defining feature-value pairs when advertisements are provided to an advertisement system. Referring to FIG. 4, a flow diagram is provided illustrating a method 400 for receiving structured information for an advertisement using sets of domain-specific features in accordance with an embodiment of the present invention. Initially, as shown at block 402, domain-specific features are identified for a variety of domains. As discussed previously, domains may include various industries such as travel, electronic products, automobiles, and the like. Additionally, varying levels of domains may be provided in a hierarchical fashion as each domain may be further subdivided into a number of lower level domains (i.e., child domains) or may be associated with a higher level domain (i.e., parent domain). For instance, an electronic products domain may include digital cameras, portable media players, and televisions domains. As another example, a travel domain may include airfare, hotel, and rental car domains.

Each domain will have features that are relevant for that domain. In some instances, a feature may be common amongst different domains. For example, price is an feature that would apply to most, if not all, domains. In other instances, a feature may be relevant for only a subset of domains, and may even be relevant only for a single domain. For example, resolution would be a relevant attribute for digital cameras but would not be relevant to other domains such as travel.

The domain-specific features identified for various domains are used to define a collection of domain-specific feature templates, as shown at block 404. Each feature template corresponds with a given domain and includes a set of relevant domain-specific features for that domain to allow for the addition of features values for given advertisements. Accordingly, a collection of feature templates are available for collecting structured information for advertisements. For example, the collection of feature templates may include a digital camera template, a portable media player template, a television template, an airfare template, a hotel template, etc. Given the wide range of possible domains, the collection may include a large number of feature templates. In embodiments of the invention in which there are varying levels of domains, feature templates may be defined at the various levels of domains. For instance, feature templates may be defined for an electronic products domain and also defined at lower level domains such as digital cameras, portable media players, and televisions. Any and all such variations are contemplated to be within the scope of embodiments of the present invention.

When an advertisement is provided to the advertisement system, as shown at block 406, a feature template is selected from the collection of feature templates, as shown at block 408. In particular, a feature template is selected based upon the domain with which the advertisement corresponds. As a specific example, if the advertisement is directed towards a digital camera, a digital camera template may be selected for collecting structured information for that advertisement. The feature template may be selected in a variety of different manners within various embodiments of the invention. In some cases, the advertiser may specifically select a feature template for the advertisement. In other cases, a feature template may be automatically selected, for instance, based on the content of the advertisement or based on information provided with the advertisement setting forth domain-relevant information for the advertisement.

The selected feature template is populated with values for the advertisement, as shown at block 410. In particular, values are provided for at least a portion of the features within the set of domain-specific feature values. In some cases, an advertiser may manually enter values for the various domain-specific features using, for instance, a UI provided by the advertisement system. In other cases, values may be provided using an API exposed by the advertisement system. In some embodiments, feature values may be automatically extracted from information sources, such as advertisement landing pages, opinion sources, and product databases. Additionally, as noted previously, values for some features may be freely entered, while some features may have a predefined set of values that may be selected for those features.

As shown at block 412, the feature-value pairs provided using the set of domain-specific features are associated with the advertisement, and the advertisement and associated feature-value pairs are stored for use by the advertisement system.

Figure 5:
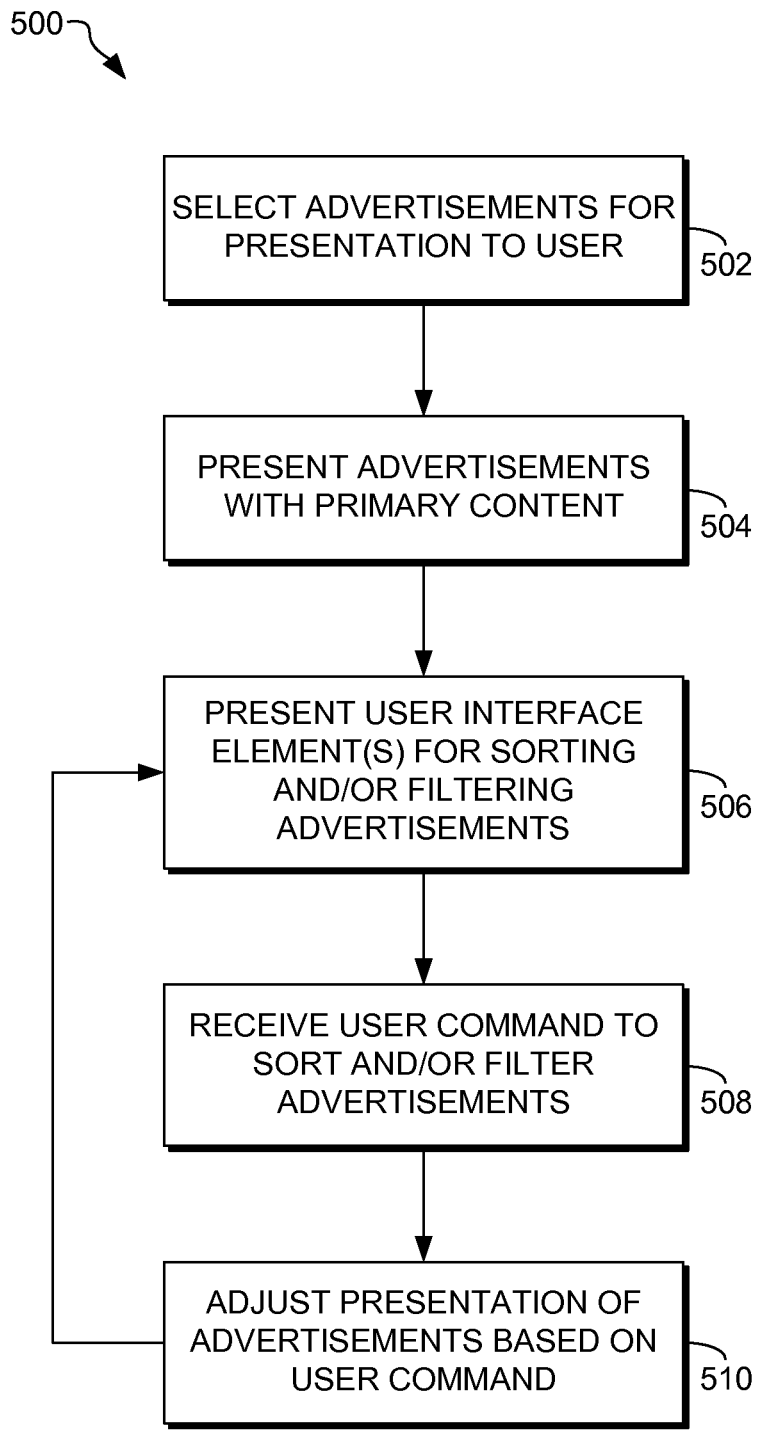
FIG. 5 is a flow diagram showing a method for allowing a user to sort and/or filter presented advertisements using feature-value pairs associated with advertisements in accordance with an embodiment of the present invention.

Referring now to FIG. 5, a flow diagram is illustrated showing a method 500 for allowing a user to sort and/or filter presented advertisements using feature-value pairs associated with advertisements in accordance with an embodiment of the present invention. As shown at block 502, a number of advertisements are selected for presentation with primary content. For instance, the advertisements may be selected for presentation with search results, on a web page, within a software application, or in context with some other primary content. Additionally, the advertisements may be selected in a number of different ways. By way of example only and not limitation, in some embodiments, an auction process is employed to select advertisements based at least in part on advertisers' bids. Advertisements may also be selected based on relevance to the primary content. In some embodiments, advertisements may simply be randomly selected.

The selected advertisements are presented to the user with the primary content, as shown at block 504. As discussed previously, the advertisements may be presented, for instance, to the side, above, or below the primary content. Additionally, the space available for presenting the advertisements may be limited. When the advertisements are presented to the user, one or more UI elements may be presented with the advertisements allowing the user to sort and/or filter the advertisements as shown at block 506. The UI elements may include, for instance, drop-down menus, lists, and other UI elements allowing users to select options to sort and/or filter the advertisements. The available options for sorting and/or filtering the advertisements are based on the feature-value pairs associated with the advertisements being presented to the user. In some instances, the advertisements may be associated with different domains, and the user may filter the advertisements by domain (e.g., the feature-value pair would be domain:value). For instance, a user may be performing a search on a search engine using the query {London}, which may result in advertisements associated with London from different domains, such as airfare and hotels. The user may choose to filter the presented advertisements such that only hotel advertisements are presented.

A user command to sort and/or filter the advertisements is received, as shown at block 508. In response to the user command, the presentation of the advertisements is adjusted based on the user command, as shown at block 510. In the case of a user command to sort the advertisements, the relative positioning of the advertisements is adjusted. For example, a user may choose to sort the advertisements by descending price. Accordingly, the advertisements with the highest price value will be listed first while the advertisements with the lowest price value will be listed last. In the case of a user command to filter the advertisements, only advertisements that meet the filtering criteria will be presented. For example, the advertisements may be associated with price groups, and the user may select to view only those advertisements associated with a particular price group.

As represented by the return to block 506, a user may continue the process at blocks 506, 508 and 510 to further filter and/or sort the advertisements. Accordingly, the user may chose to view the advertisements under a number of different criteria, allowing the user to quickly glean a variety of in-depth information regarding the advertisements, while remaining within the context of their primary content.

Figure 6:
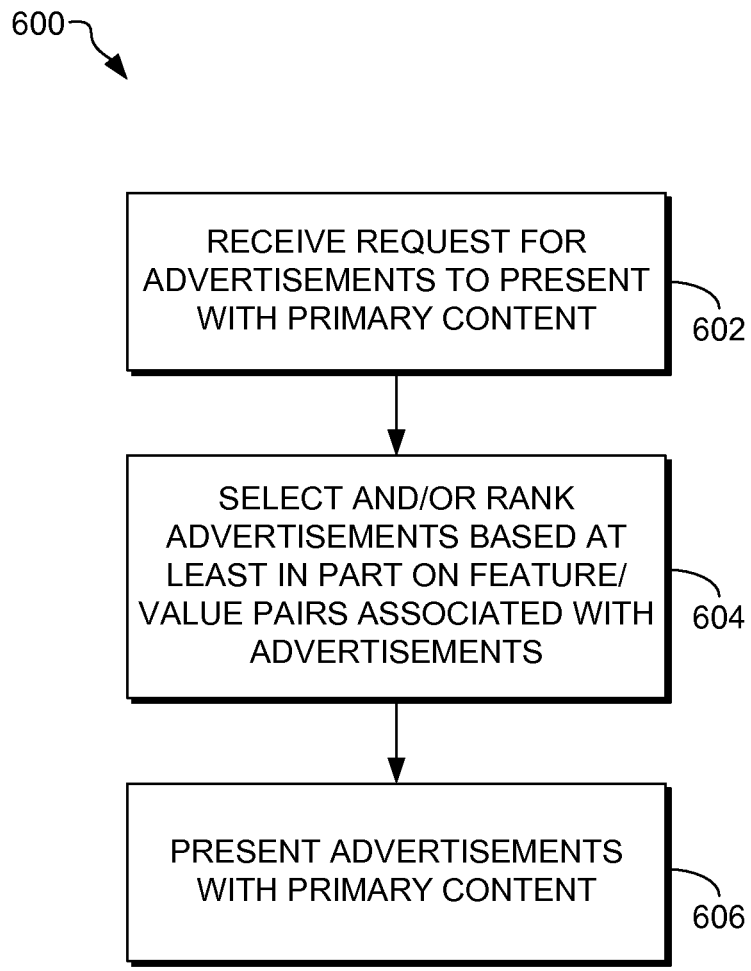
FIG. 6 is a flow diagram showing a method for selecting and/or ranking advertisements using structured information as feature-value pairs associated with advertisements in accordance with an embodiment of the present invention.

Turning to FIG. 6, a flow diagram is provided illustrating a method 600 for using feature-value pairs associated with advertisements to select and/or rank advertisements for presentation to a user in accordance with an embodiment of the present invention. As shown at block 602, a request for advertisements to present to a user is initially received. For instance, an advertising system may receive a request for advertisements for inclusion with search results from a search engine, for presentation on a web page, or for presentation with some other primary content.

As shown at block 604, a number of advertisements are selected in response to the request. The advertisements are selected and/or ranked based at least in part on feature-value pairs associated with at least a portion of the advertisements. For instance, in some embodiments, advertisements may be selected and ranked based on their relevance to the context of the primary content with which the advertisements will be presented. In such embodiments, feature-value pairs associated with advertisements may provide additional information for determining advertisements' relevance to the primary content. In other embodiments, feature-value pair information associated with advertisements may be used in conjunction with user profiles or other available user information to select and/or rank advertisements for presentation with primary content. For instance, available user information may indicate that a particular user is located in a particular geographic region. If airfare advertisements were selected for presentation to the user, particular advertisements having the user's geographic region as the origination may be selected and/or ranked over other advertisements. As another example, user information may indicate that price is an important feature of electronic products for a given user. When electronic products advertisements are selected for presentation to the user, the advertisements may be sorted by price when presented to the user based on the user information.

After selecting and/or ranking the advertisements based at least in part on feature-value information, the advertisements are presented to the user with the primary content, as shown at block 606. In some embodiments, user interface elements may be provided with the advertisements allowing the user to further sort and/or filter the advertisements, for instance, using the method 500 of FIG. 5. Additionally, in some embodiments, some feature-value pair information may be exposed to the user by presenting the information with the advertisements Embodiments of the present invention will now be described with reference to FIGS. 7-11, which include exemplary screen displays of advertisements being presented in conjunction with search results. It will be understood and appreciated by those of ordinary skill in the art that the screen displays of FIGS. 7-11 are provided by way of example only and are not intended to limit the scope of the present invention in any way. For instance, although FIGS. 7-11 illustrate embodiments in which advertisements are presented with search results, in other embodiments of the invention, advertisements may be presented with other types of primary content, such as on web pages and within software applications.

Figure 7:
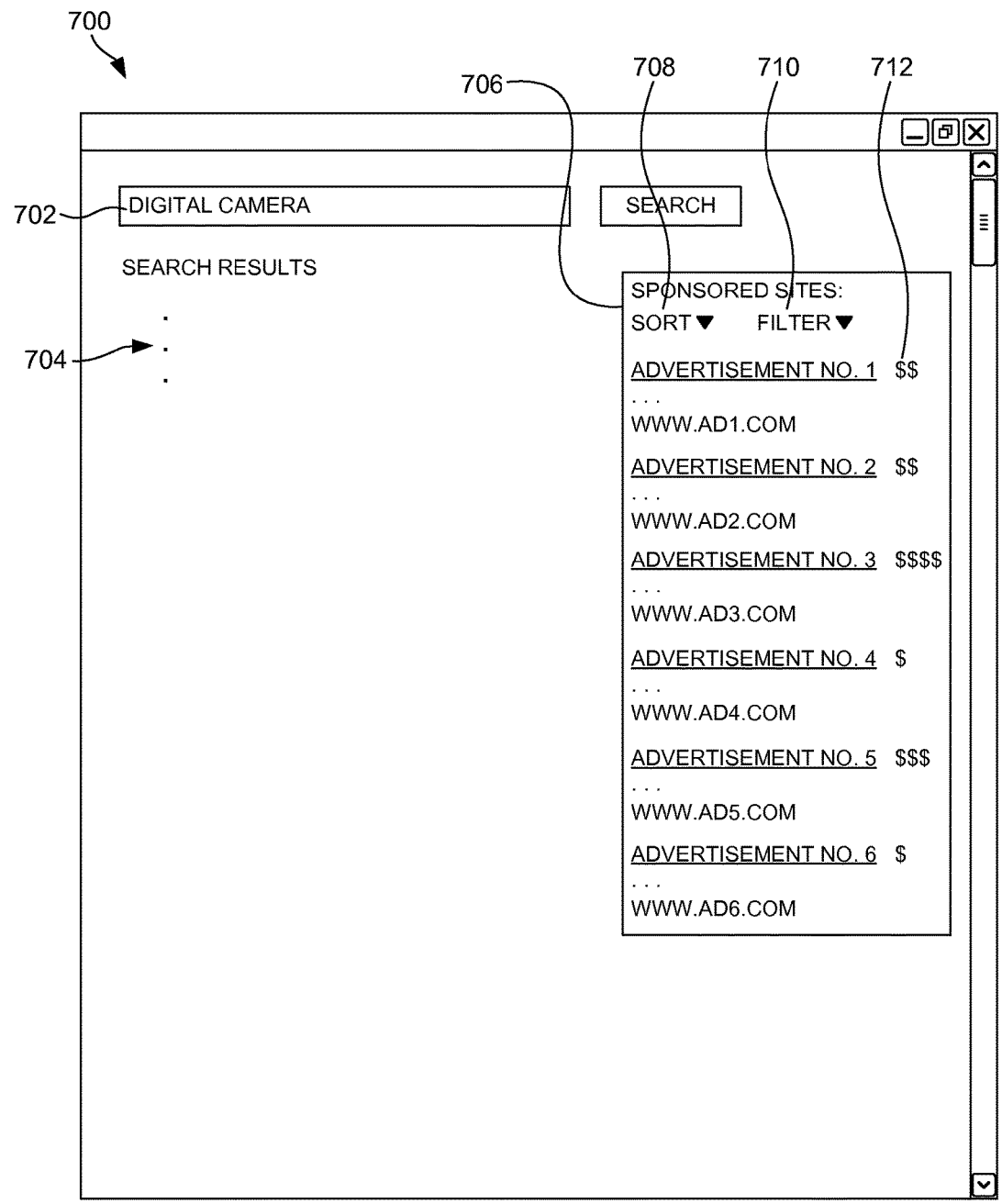
FIG. 7 is a screen display illustrating an initial presentation of advertisements with search results in accordance with an embodiment of the present invention.

Referring initially to FIG. 7, a screen display 700 is provided illustrating the initial presentation of advertisements with search results in accordance with an embodiment of the present invention. As shown in the example of FIG. 7, a user has performed a search using the input query {digital camera} 702. Based on the input query, a number of web page search results are presented in the search results area 704 (note that search results are not shown for clarity purposes). Additionally, a number of advertisements have been selected and are presented in the advertisement area 706. As noted previously, the initial selection and ordering of advertisements may be performed in a number of different manners. For instance, an auction process may be performed for selecting the advertisements based on amounts bid on terms corresponding with the search query. As also noted previously, in some embodiments, the initial advertisement selection and ordering may also be based in part on structured information associated with the advertisements as feature-value pairs.

Within the advertisement area 706, UI elements 708 and 710 are also provided for sort and filtering the advertisements based on feature-value pairs associated with the advertisements. In particular, a sort UI element 708 is provided for sorting the advertisements, and a filter UI element 710 is provided for filtering the advertisements. Also shown with each advertisement are icons 712 exposing structured information from the feature-value pairs. In particular, dollar sign icons 712 are presented with each advertisement representing a value associated with a price feature for each advertisement.

Figure 8:
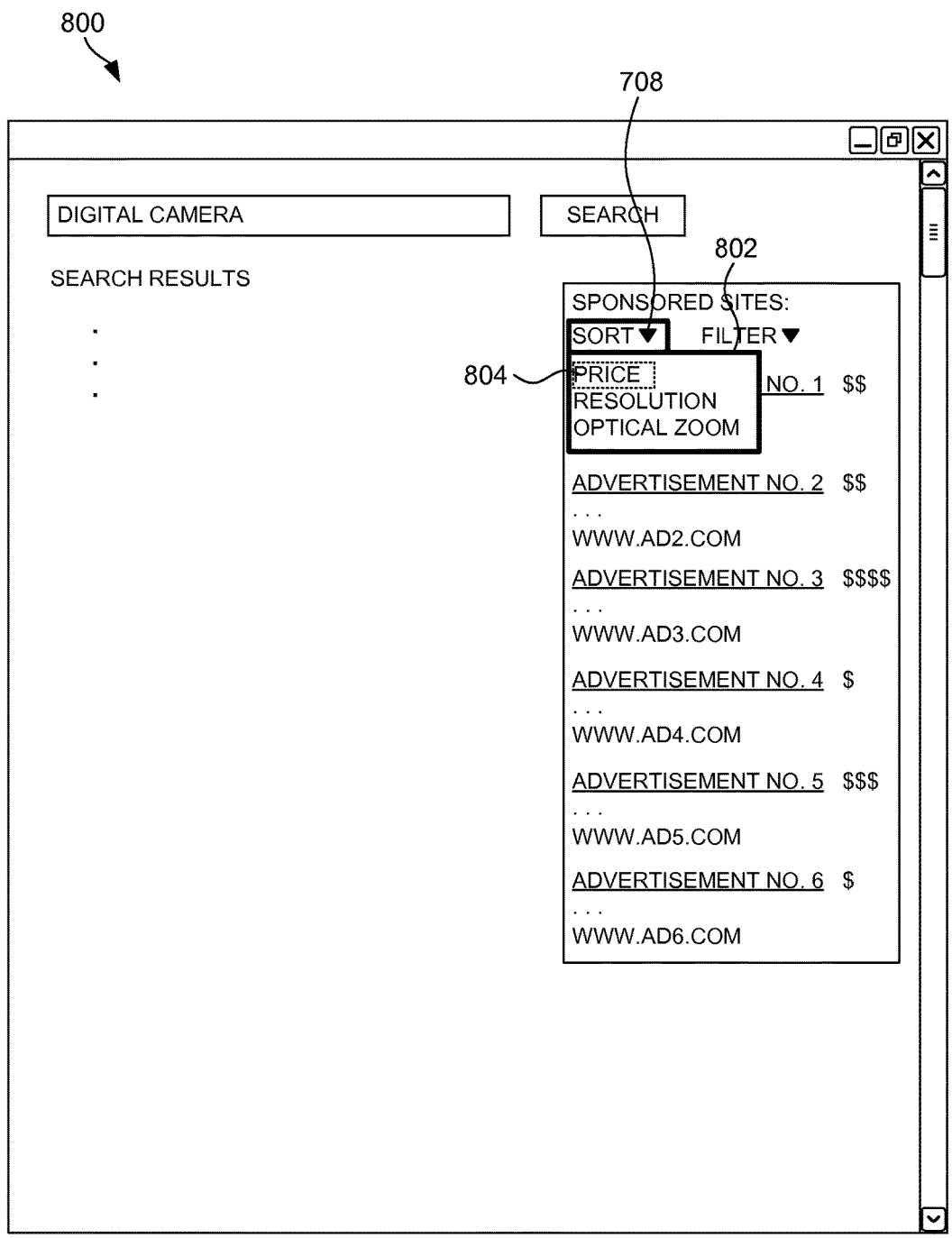
FIG. 8 is a screen display illustrating a user selecting to sort the presentation of advertisements using structured information associated with the advertisements in accordance with an embodiment of the present invention.
Figure 9:
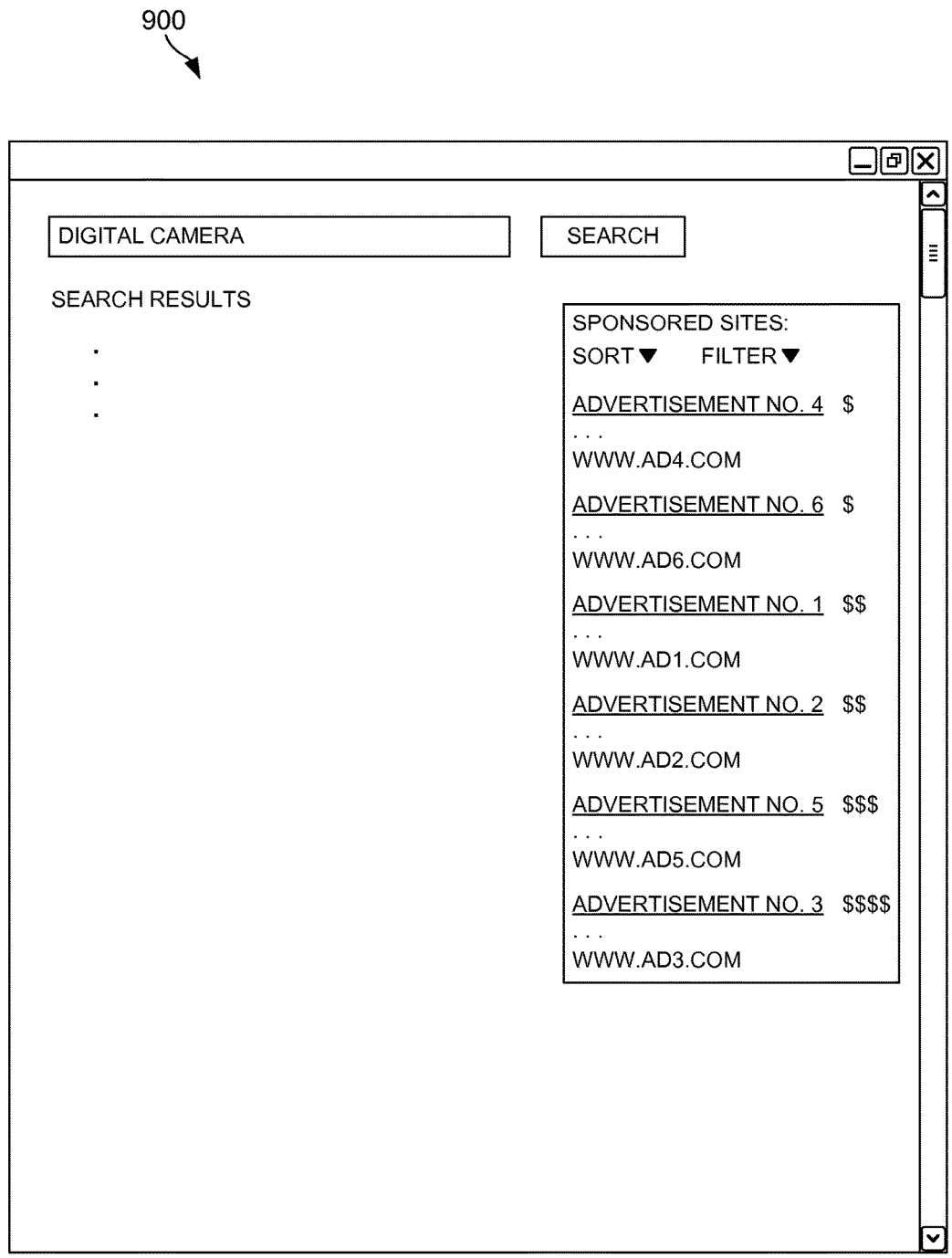
FIG. 9 is a screen display illustrating advertisements sorted based on the user selection of FIG. 8 in accordance with an embodiment of the present invention.
Figure 10:
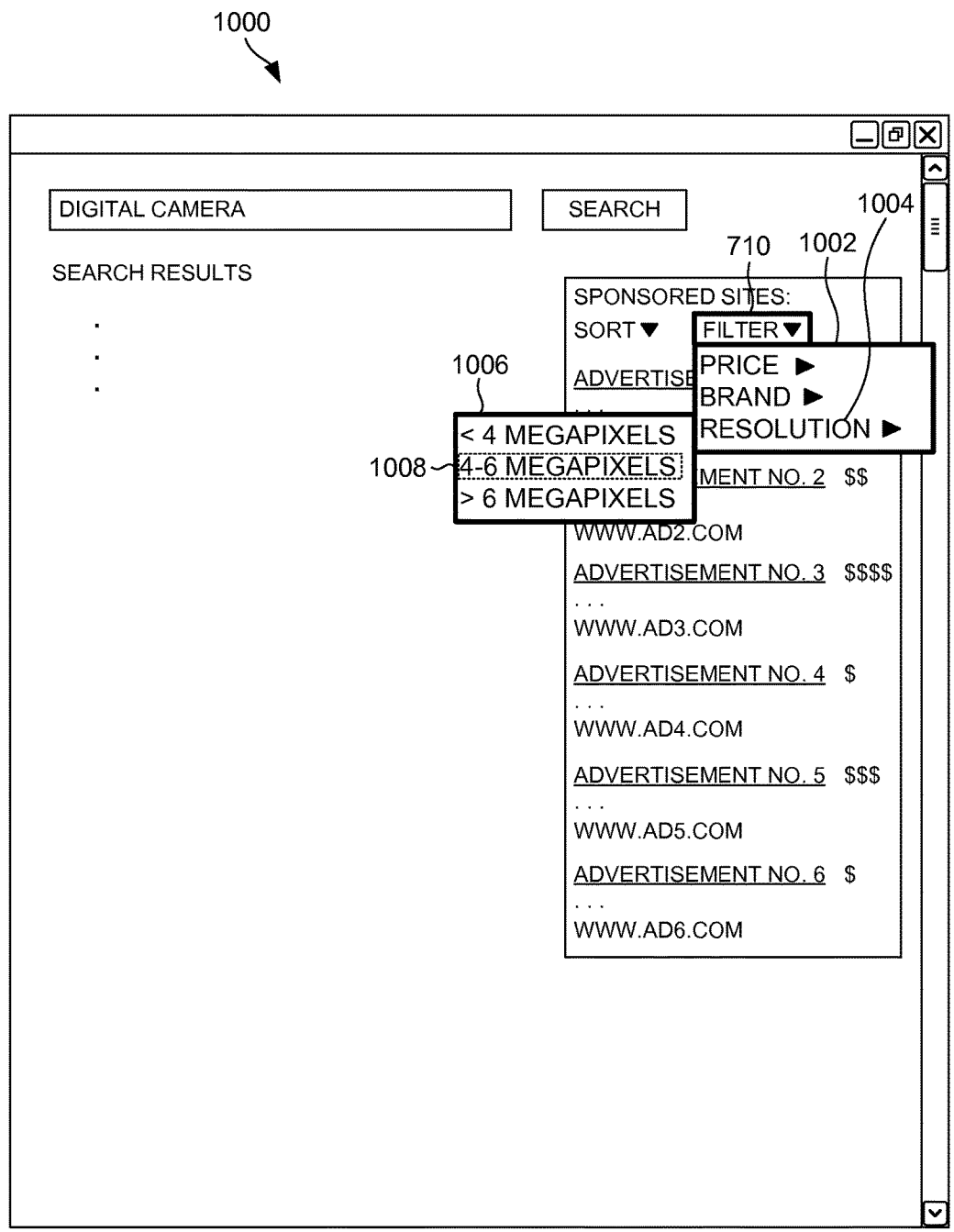
FIG. 10 is a screen display illustrating a user selecting to filter advertisements being presented using structured information associated with the advertisements in accordance with an embodiment of the present invention.

Referring to the screen display 800 shown in FIG. 8, if the user decides to sort the advertisements, the user may select the sort UI element 708 (e.g., using a pointing device such as a mouse), causing a list 802 of features for sorting the advertisements. The list 802 of features in the present example include "price," "resolution," and "optical zoom." In the present example, the user decides to sort the advertisements by "price" and selects the "price" option 804 from the list 802. Based on the user selection, the advertisements are sorted or listed in an order that reflects the values associated with each advertisement for the selected "price" feature. For instance, the screen display 900 shown in FIG. 9 illustrates the advertisements sorted based on price.

Figure 11:
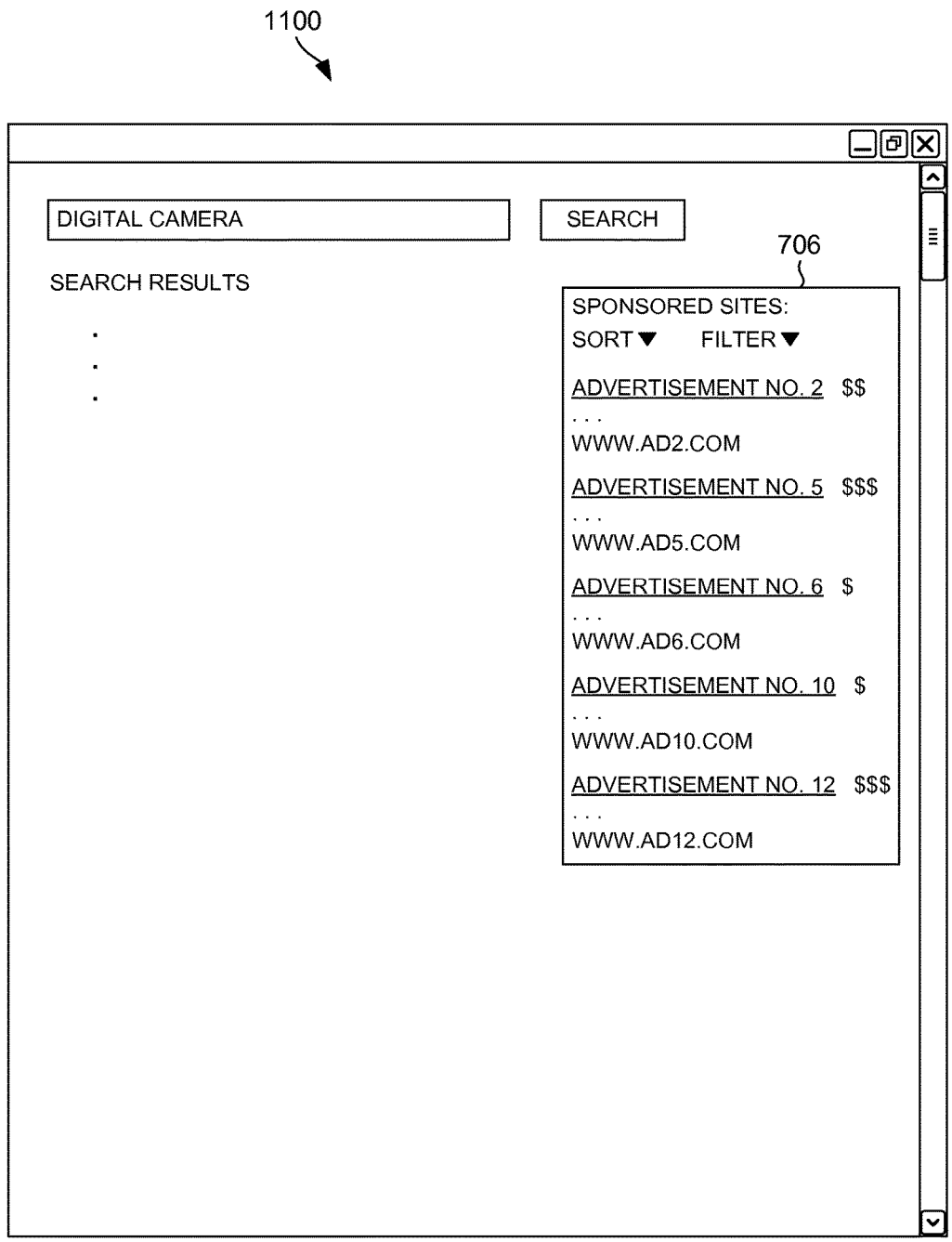
FIG. 11 is a screen display illustrating advertisements after filtering based on the user selection of FIG. 10 in accordance with an embodiment of the present invention.

In some instances, the user may wish to filter advertisements. Referring the to the screen display 1000 of FIG. 10, the user has selected the filter UI element 710, causing a list 1002 of features for filtering the advertisements. In particular, the list 1002 of features includes "price," "brand," and "resolution." In the present example, the user has selected the "resolution" feature 1004, causing a list 1006 of options for filtering based on the selected feature. The list 1006 of options for filtering based on the feature include "<4 megapixels," "4-6 megapixels," and ">6 megapixels." Supposing the user selects "4-6 megapixels" 1008, advertisements are filtered such that only advertisements corresponding with the filter criteria are presented. Accordingly, the advertisements meeting the filter criteria are presented in the advertisement area 706 as shown in the screen display 1100 of FIG. 11. As shown in FIG. 11, in some cases, a sorting or filtering action may cause previously displayed advertisements to be no longer displayed, and advertisements to be displayed that were not previously displayed. For instance, based on the filtering action of the present example, advertisement numbers 1, 3, and 4 that were previously displayed are no longer displayed, and advertisement numbers 10 and 12 that were not previously displayed are now displayed.

It should be noted that sorting and filtering the advertisements typically will not affect the primary content. For instance, in the screen displays 700, 800, 900, 1000, and 1100 of FIGS. 7-11, as the user sorts and filters the advertisements, only the presentation of the advertisements are affected, while the search results presented in the search results area 706 remain unchanged.

As can be understood, embodiments of the present invention provide for the association of feature-value pairs with advertisements to be presented with primary content, such as search results or on a web page. The association of feature-value pairs with advertisements may be used in a variety of different manners, including, but not limited to: allowing a user to sort and/or filter advertisements while the advertisements are presented with primary content; providing further information to a user when advertisements are presented; facilitating ranking of advertisements; facilitating fraud detection; and allowing hybrid pricing models.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media embodying computer-useable instructions for performing a method comprising:
   storing an advertisement corresponding with a product or service and one or more feature-value pairs for the advertisement for use in an advertisement system that provides advertisements for presentation in conjunction with presentation of separate primary content, each feature-value pair for the advertisement being separate from the content of the advertisement and comprising a feature of the product or service and a value defining the feature of the product or service;
   receiving a request for advertisements from a user device; and
   providing, for delivery to the user device in response to the request, a plurality of advertisements and one or more feature-value pairs for each advertisement separate from the content of each advertisement for use in a user interface that presents at least a portion of the advertisements in conjunction with separate primary content and one or more user interface elements that allow a user to sort or filter the advertisements based on the feature-value pairs associated with the advertisements while maintaining the presentation of the separate primary content, the one or more user interface elements being generated based on the feature-value pairs associated with the advertisements.

2. The one or more computer-storage media of claim 1, wherein the one or more feature-value pairs for the advertisement are received from an advertiser by:
   providing a plurality of domain-specific feature sets, wherein each domain-specific feature set comprises a set of features that are relevant to a given domain;
   selecting one of the domain-specific feature sets as a selected domain-specific feature set; and
   receiving values for at least a portion of the features within the selected domain-specific feature set.

3. The one or more computer-storage media of claim 2, wherein selecting one of the domain-specific feature sets comprises at least one of:
   receiving an advertiser selection of one of the domain-specific feature sets; and
   automatically selecting one of the domain-specific feature sets by determining a domain for the advertisement.

4. The one or more computer-storage media of claim 2, wherein at least a portion of the features within the selected domain-specific feature set each have pre-defined values available for selection.

5. The one or more computer-storage media of claim 1, wherein the one or more feature-value pairs for the advertisement are received from an advertiser.

6. The one or more computer-storage media of claim 1, wherein the one or more feature-value pairs for the advertisement are automatically determined.

7. The one or more computer-storage media of claim 1, wherein the plurality of advertisements are selected based at least in part on the one or more feature-value pairs associated with the advertisements.

8. The one or more computer-storage media of claim 1, wherein the primary content comprises at least one of:
   search results; and
   a web page content.

9. A method comprising:
   presenting a plurality of advertisements in conjunction with presentation of separate primary content, wherein at least a portion of the advertisements have associated feature-value pairs separate from the content of the advertisements, wherein each feature-value pair comprises a feature of a product or service corresponding with one of the advertisements and a value defining the feature of the product or service;
   generating one or more user interface elements based on the feature-value pairs associated with the at least a portion of the advertisements;
   presenting the one or more user interface elements with the advertisements, wherein the one or more user interface elements allow a user to sort or filter the advertisements based on the feature-value pairs associated with the at least a portion of the advertisements;

receiving a user command via at least one of the user interface elements to sort or filter the advertisements; and sorting or filtering the advertisements based on the user command while maintaining the presentation of the separate primary content.

10. The method of claim 9, wherein the method further comprises selecting the plurality of advertisements for presentation to the user in conjunction with the primary content.

11. The method of claim 10, wherein the plurality of advertisements are selected based at least in part on the feature-value pairs associated with at least a portion of the advertisements.

12. The method of claim 9, wherein the one or more user interface elements include a list of one or more features associated with the plurality of advertisements for sorting or filtering the advertisements.

13. The method of claim 12, wherein the list of one or more features includes a domain feature for filtering the plurality of advertisements by domain.

14. The method of claim 13, wherein receiving a user command to sort or filter the advertisements comprises receiving a user command to filter the advertisements for a user-selected domain, and wherein sorting or filtering the advertisements comprises filtering the advertisements such that a subset of advertisements corresponding with the user-selected domain is presented.

15. The method of claim 9, wherein the primary content comprises at least one of:
search results; and
a web page content.

16. A computerized system comprising:
one or more processors; and
one or more computer storage media storing instructions that, when used by the one or more processors, cause the one or more processors to:
receive a request for advertisements for presentation in conjunction with separate primary content;
select the advertisements for presentation in conjunction with the separate primary content based at least in part on the primary content and feature-value pairs associated with at least a portion of the advertisements and separate from the content of the advertisements, wherein each feature-value pair comprises a feature of a product or service corresponding with one of the advertisements and a value defining the feature of the product or service;
generate a user interface with a first portion of the user interface for presenting the primary content and a second portion of the user interface for presenting the advertisements and one or more user interface elements that allow a user to sort or filter the advertisements based on the feature-value pairs associated with the advertisements while maintaining the presentation of the separate primary content, wherein the user interface is generated at least in part by selecting the one or more user interface elements based on the feature-value pairs associated with the advertisements; and
communicate the user interface, the advertisements for presentation in conjunction with the separate primary content, and one or more feature-value pairs for each advertisement separate from the content of each advertisement for use in the user interface that includes one or more user interface elements that allow the user to sort or filter the advertisements based on the feature-value pairs associated with the advertisements while maintaining the presentation of the separate primary content.

17. The system of claim 16, wherein the advertisements for presentation are selected by ranking the advertisements based at least in part on the feature-value pairs.

18. The system of claim 16, wherein the advertisements for presentation are selected by determining relevance of the advertisements to the primary content by comparing the feature-value pairs against the context of the primary content.

19. The system of claim 18, wherein the advertisements are ranked based on the relevance of the advertisements to the primary content.

20. The system of claim 16, wherein the advertisements for presentation are selected based at least in part on user information for the user in conjunction with the feature-value pairs.

* * * * *